US012792453B2

(12) United States Patent

Mukherjee et al.

(10) Patent No.: US 12,792,453 B2
(45) Date of Patent: Nov. 10, 2026

(54) CONSOLIDATING ANOMALY DETECTION METHODS USING HYBRID ARTIFICIAL INTELLIGENCE

(71) Applicant: Bank of America Corporation, Charlotte, NC (US)

(72) Inventors: Maharaj Mukherjee, Poughkeepsie, NY (US); Carl Benda, Charlotte, NC (US); Aditya Krishnanand Chaubey, Maharashtra (IN); Rahul Uniyal, Uttarakhand (IN); Vijay Yarabolu, Hyderabad (IN); Viraj Shah, Maharashtra (IN); Duy Minh Pham, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/816,304

(22) Filed: Aug. 27, 2024

(65) Prior Publication Data

US 2026/0064520 A1 Mar. 5, 2026

(51) Int. Cl.

| | |
|---|---|
| ***G06F 11/00*** | (2006.01) |
| ***G06F 11/07*** | (2006.01) |
| ***G06N 20/20*** | (2019.01) |

(52) U.S. Cl.

CPC ...... *G06F 11/0793* (2013.01); *G06F 11/0769* (2013.01); *G06N 20/20* (2019.01)

(58) Field of Classification Search

CPC .......................... G06F 11/0793; G06F 11/0769

(Continued)

(56) References Cited

U.S. PATENT DOCUMENTS

| | | | |
|---|---|---|---|
| 7,719,997 | B2 | 5/2010 | Weinman |
| 8,612,802 | B1 | 12/2013 | Havemose |

(Continued)

FOREIGN PATENT DOCUMENTS

| | | | |
|---|---|---|---|
| CN | 112101431 | A | 12/2020 |
| CN | 113139610 | A | 7/2021 |

(Continued)

OTHER PUBLICATIONS

Oct. 1, 2025—(US) Office Action—U.S. Appl. No. 18/816,222.

(Continued)

*Primary Examiner* — Sarai E Butler

(74) *Attorney, Agent, or Firm* — Banner & Witcoff, Ltd.

(57) ABSTRACT

A computing platform may monitor a system to collect system status information. The computing platform may input the system status information into each of a plurality of anomaly detection engines, which may each output, based on the system status information, a corresponding binary value indicating whether the system status information is anomalous according to the given anomaly detection engine, and a corresponding confidence level. The computing platform may input information of the plurality of anomaly detection engines into a hybrid artificial intelligence engine, which may assign the weight values to each of the plurality of anomaly detection engines and selects a binary value based on the weighting. Based on identifying that the selected binary value is less than a predetermined threshold value, the computing platform may label the system as experiencing anomalous behavior. The computing platform may execute one or more corrective actions to address the anomalous behavior.

19 Claims, 9 Drawing Sheets

(58) Field of Classification Search
USPC ........................................................ 714/1–57
See application file for complete search history.

(56) References Cited

U.S. PATENT DOCUMENTS 8,942,085 B1 1/2015 Pani et al.
9,225,628 B2 12/2015 Zahavi
9,367,366 B2 6/2016 Xiong et al.
9,954,882 B2 4/2018 Seo et al.
10,404,569 B2 9/2019 Hershey et al.
10,749,883 B1 8/2020 Martin et al.
10,990,516 B1 4/2021 Merritt
11,005,872 B2 5/2021 Dherange et al.
11,080,906 B2 8/2021 Garvey et al.
11,082,439 B2 8/2021 Salunke et al.
11,126,167 B2 9/2021 SayyarRodsari et al.
11,194,691 B2 12/2021 Dherange et al.
11,308,407 B1 4/2022 Guha et al.
11,455,639 B2 9/2022 Manske et al.
11,507,563 B2 11/2022 Yeddu
11,509,671 B2 11/2022 Servajean et al.
11,544,585 B2 1/2023 Ahringer et al.
11,561,849 B1 1/2023 Kairali et al.
11,687,438 B1 6/2023 Torbett et al.
11,741,486 B1 8/2023 Bar Eliyahu et al.
11,747,801 B2 9/2023 SayyarRodsari et al.
11,748,568 B1 9/2023 Orhan et al.
11,836,162 B2 12/2023 Garvey et al.
11,868,957 B1 1/2024 Bhure et al.
11,893,645 B2 2/2024 Przechocki et al.
11,924,048 B2 3/2024 Servajean et al.
11,962,484 B1 4/2024 Jain et al.
12,050,628 B1 7/2024 O'Hara et al.
12,056,000 B1 8/2024 Kawata et al.
12,261,866 B1 3/2025 Yen et al.
12,298,990 B1 5/2025 Han et al.
12,299,084 B2 5/2025 Kallianpur et al.
2008/0263401 A1 10/2008 Stenzel
2010/0122114 A1* 5/2010 Hung .................. G11C 16/349 711/E12.001
2010/0262860 A1* 10/2010 Sargor .................. G06F 9/5083 714/E11.071
2013/0191681 A1 7/2013 Moiseev et al.
2014/0195184 A1 7/2014 Maeda et al.
2014/0304813 A1 10/2014 Ma et al.
2015/0161024 A1 6/2015 Gupta et al.
2017/0339178 A1 11/2017 Mahaffey et al.
2019/0050515 A1* 2/2019 Su .......................... G06N 3/045
2019/0079821 A1* 3/2019 Jeong .................... G06F 11/079
2020/0159624 A1* 5/2020 Malkov .................. G06N 20/00
2020/0285997 A1 9/2020 Bhattacharyya et al.
2020/0387797 A1 12/2020 Ryan et al.
2021/0011467 A1 1/2021 SayyarRodsari et al.
2021/0064458 A1 3/2021 Rathinasabapathy et al.
2021/0082292 A1 3/2021 Sindhwani et al.
2021/0124342 A1* 4/2021 Shukla ............... G05B 23/0283
2021/0390507 A1 12/2021 Reynolds et al.
2022/0058174 A1 2/2022 Lemberg et al.
2022/0215007 A1 7/2022 Bedadala et al.
2022/0262104 A1 8/2022 Salman et al.
2022/0382611 A1 12/2022 Kapish et al.
2023/0019703 A1 1/2023 Behzad et al.
2023/0106369 A1 4/2023 Flynn
2023/0118240 A1 4/2023 Wong et al.
2023/0124166 A1 4/2023 Mohanty et al.
2023/0126842 A1 4/2023 Tabet et al.
2023/0135825 A1* 5/2023 Surisetty ............. G06F 11/3051 714/47.2
2023/0195715 A1 6/2023 Schleith et al.
2023/0229574 A1* 7/2023 Gandluri ............. G06F 11/2038 714/4.11
2023/0236918 A1* 7/2023 Pachamuthu ....... G06F 16/2358 714/57
2023/0274160 A1 8/2023 Mujumdar et al.
2023/0275915 A1 8/2023 Kaul
2023/0276080 A1 8/2023 Penmetcha et al.
2023/0281068 A1 9/2023 Friedrich et al.
2023/0308461 A1 9/2023 Flysher et al.
2023/0315559 A1* 10/2023 Yokomatsu ......... G06F 11/0769 714/37
2023/0319069 A1 10/2023 Birch et al.
2023/0325632 A1 10/2023 Kasmani et al.
2023/0336447 A1 10/2023 Kommula et al.
2023/0342656 A1 10/2023 Robinson et al.
2023/0359706 A1 11/2023 Yang et al.
2023/0368069 A1 11/2023 Xu et al.
2023/0419402 A1 12/2023 Ghelichi et al.
2024/0054399 A1 2/2024 Hong et al.
2024/0086819 A1 3/2024 Baviskar et al.
2024/0097999 A1 3/2024 Sun et al.
2024/0144712 A1 5/2024 Kumar et al.
2024/0152442 A1 5/2024 Sethi et al.
2024/0184682 A1 6/2024 Vudathu
2024/0195475 A1 6/2024 Hellgren et al.
2024/0202326 A1 6/2024 Josyula et al.
2024/0241867 A1 7/2024 Nirantar et al.
2024/0244070 A1 7/2024 Mohapatra et al.
2024/0264810 A1 8/2024 Jayaraman
2024/0282085 A1 8/2024 Kondo
2024/0340225 A1 10/2024 Pease et al.
2024/0340314 A1 10/2024 Radon et al.
2024/0342911 A1 10/2024 Sasashige et al.
2024/0403099 A1 12/2024 Verma et al.
2025/0028737 A1 1/2025 Bai et al.
2025/0103605 A1 3/2025 Gianelle et al.
2025/0124502 A1 4/2025 Antonini et al.
2025/0138935 A1* 5/2025 Atkinson ............ G06F 11/3055
2025/0165442 A1 5/2025 Liu et al.
2025/0200073 A1 6/2025 Ragukumar et al.
2025/0200355 A1 6/2025 Ragukumar et al.
2025/0235154 A1 7/2025 Binnal et al.
2025/0272182 A1* 8/2025 Sethi ....................... H04L 41/22

FOREIGN PATENT DOCUMENTS

CN 113190842 A 7/2021
CN 118301011 A 7/2024
CN 118940854 A 11/2024
EP 3055747 A1 8/2016
EP 3423954 A1 1/2019
JP 5301310 B2 9/2013
JP 5538597 B2 7/2014
TW 201510688 A 3/2015
WO 2011132524 A1 10/2011

OTHER PUBLICATIONS

Feb. 3, 2026—(US) Office Action—U.S. Appl. No. 18/816,272.
Feb. 24, 2026—(US) Notice of Allowance—U.S. Appl. No. 18/816,222.
Oct. 10, 2025—(US) Non-Final Office Action—U.S. Appl. No. 18/794,195.
Jun. 16, 2025—(US) Non-Final Office Action—U.S. Appl. No. 18/794,195.
May 20, 2026—(US) Notice of Allowance—U.S. Appl. No. 18/816,222.
Jul. 7, 2026—(US) Final Office Action—U.S. Appl. No. 18/816,272.
Jun. 22, 2026—(US) Non-Final Office Action—U.S. Appl. No. 18/794,195.

* cited by examiner

605

CONSOLIDATING ANOMALY DETECTION METHODS USING HYBRID ARTIFICIAL INTELLIGENCE

BACKGROUND

In some instances, enterprise organizations may have an obligation to ensure that their technical infrastructure always operates flawlessly and with maximum efficiency. To do so, it may be advantageous for such enterprise organizations to predict and understand system anomalies within their proxy servers, and to take mitigating actions in the event that an anomaly is detected. Different methods of anomaly detection may come with their own sets of advantages and disadvantages. For example, isolation forest may be an effective technique for detecting anomalies accurately, but might not consider seasonal variations. On the other hand, methods like SARIMAX may be effective at considering seasonal variations, but might not otherwise be as accurate as isolation forest.

SUMMARY

Aspects of the disclosure provide effective, efficient, scalable, and convenient technical solutions that address and overcome the technical problems associated with detecting system anomalies. In accordance with one or more embodiments of the disclosure, a computing platform comprising at least one processor, a communication interface, and memory storing computer-readable instructions may train, using historical anomaly prediction information, a hybrid artificial intelligence engine, which may configure the hybrid artificial intelligence engine to assign weight values to each of a plurality of anomaly detection engines and to select an anomaly detection result from the plurality of anomaly detection engines based on the weight values. The computing platform may monitor a system to collect system status information. The computing platform may input the system status information into each of the plurality of anomaly detection engines, where each of the plurality of anomaly detection engines may output, based on the system status information, a corresponding binary value indicating whether the system status information is anomalous according to a given anomaly detection engine, and a corresponding confidence level associated with the corresponding binary value. The computing platform may input information of the plurality of anomaly detection engines into the hybrid artificial intelligence engine, where the hybrid artificial intelligence engine may assign the weight values to each of the plurality of anomaly detection engines and select a binary value based on the weighting. The computing platform may compare the selected binary value to a predetermined threshold value. Based on identifying that the selected binary value is less than the predetermined threshold value, the computing platform may label the system as experiencing anomalous behavior. The computing platform may execute one or more corrective actions to address the anomalous behavior.

In one or more instances, the computing platform may train, using historical system status information, the plurality of anomaly detection engines, where each of the plurality of anomaly detection engines may correspond to a different machine learning model, and where training the plurality of anomaly detection engines may configure each of the plurality of anomaly detection engines to output, for given system status inputs, a binary value indicating whether or not the system status input indicates an anomaly, and a confidence level associated with the binary value. In one or more instances, the historical system status information may include one or more of: memory usage, computer processing unit (CPU) usage, available memory, memory consumption, communication patterns, processing speed, or labels indicating anomaly or no anomaly.

In one or more examples, the confidence level may indicate a confidence of a corresponding anomaly detection engine that the binary value correctly indicates whether or not an anomaly is detected. In one or more examples, one of the plurality of anomaly detection engines may include an isolation forest model to identify the binary value.

In one or more instances, the system may be labelled as experiencing the anomalous behavior in real time. In one or more instances, the system may be labelled as experiencing the anomalous behavior in a predictive manner. In one or more instances, assigning the weight values may include assigning, to each of the plurality of anomaly detection engines, a first weight value generated using statistical machine learning and a second weight value generated based on human intelligence.

In one or more examples, the weight values may be specific to each application of each of the plurality of anomaly detection engines in a particular problem domain. In one or more examples, selecting the binary value may include selecting the binary value produced by one of the plurality of anomaly detection engines associated with the highest weight value.

In one or more instances, executing the one or more corrective actions may include one or more of: taking the system offline, redistributing load of the system, or adding memory to the system. In one or more instances, the computing platform may send, to a user device of a system administrator, an alert indicating the anomalous behavior and one or more commands directing the user device to display the alert, wherein sending the one or more commands directing the user device to display the alert causes the user device to display the alert.

In one or more examples, the computing platform may update, based on the system status information and the label, the plurality of anomaly detection engines. In one or more examples, the computing platform may update, based on feedback associated with the label, the hybrid artificial intelligence engine.

BRIEF DESCRIPTION OF DRAWINGS

The present disclosure is illustrated by way of example and is not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

The following description relates to using statistical machine learning to understand and change the weighted average of confidence levels of procedure calls from different anomaly detection engines. Additionally, certain user specific rules may be considered that may favor one arbitration engine over another, thus creating a hybrid artificial intelligence based arbitrator.

These and other features are described in greater detail below.

Figure 1A:
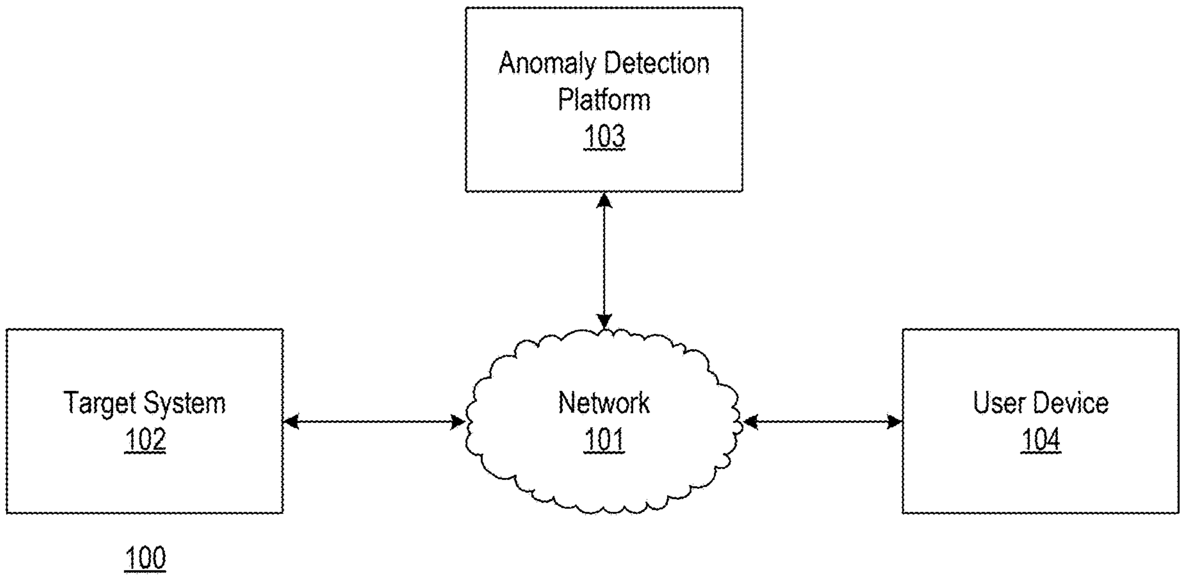
FIGS. 1A and 1B depict an illustrative computing environment for using hybrid artificial intelligence to consolidate methods of anomaly detection in accordance with one or more example embodiments.
Figure 1B:
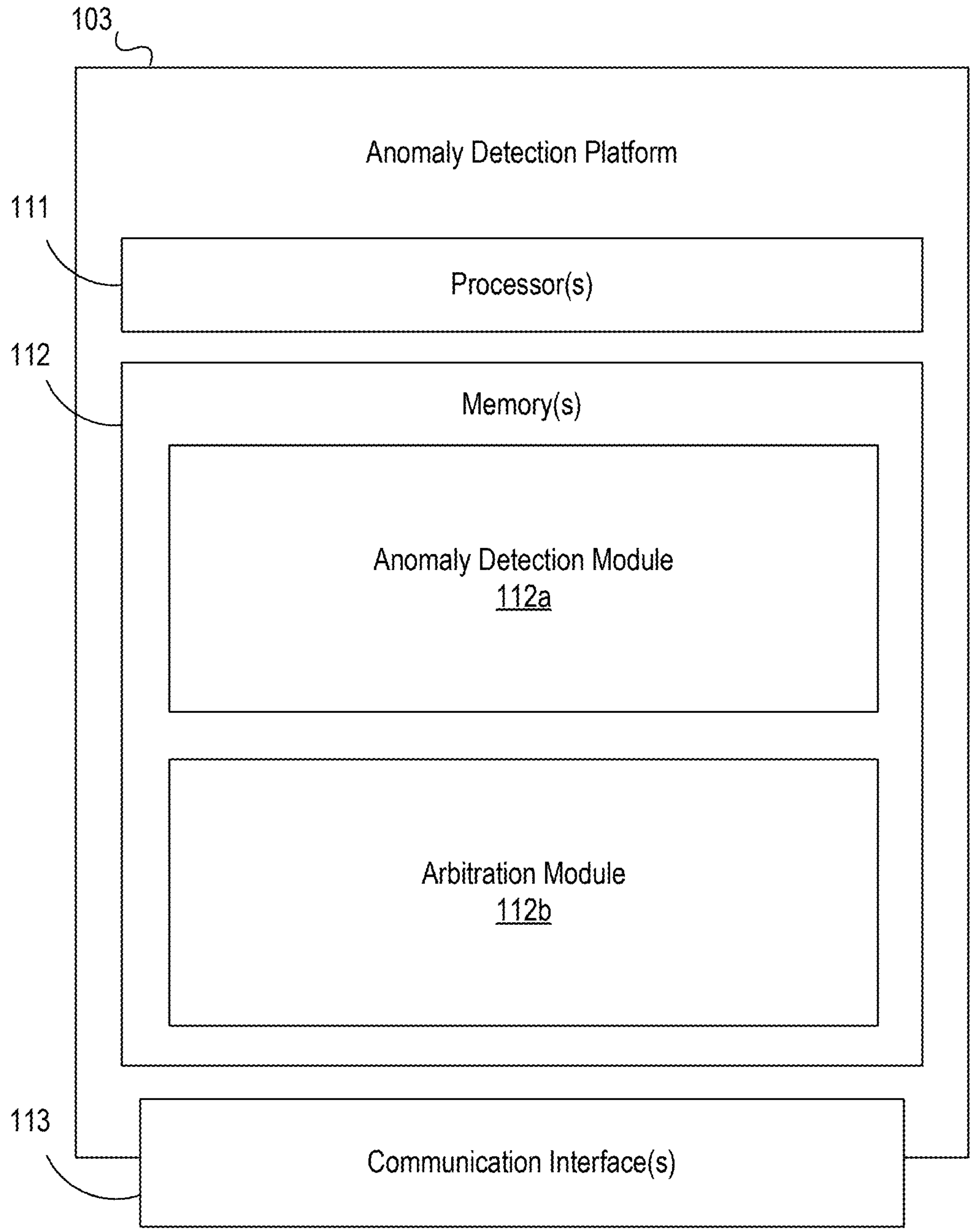

FIGS. 1A-1B depict an illustrative computing environment for using hybrid artificial intelligence to consolidate methods of anomaly detection in accordance with one or more example embodiments. Referring to FIG. 1A, computing environment 100 may include one or more computer systems. For example, computing environment 100 may include target system 102, anomaly detection platform 103, and user device 104.

Target system 102 may include one or more computing devices (servers, server blades, or the like) and/or other computer components (e.g., processors, memories, communication interfaces, or the like). For example, the target system 102 may be configured to perform various computing tasks, and may have associated parameters that may change as the tasks are performed. For example, available processing resources, computer processing units (CPU), or memory, processing speed, latency, and/or other parameters associated with the target system 102 may adjust. In some instances, the target system 102 may be an enterprise computing system maintained and/or otherwise associated with an enterprise organization, such as a financial institution. Although a single target system is illustrated, any number of such target systems may be included without departing from the scope of the disclosure.

Anomaly detection platform 103 may be or include one or more computing devices (e.g., servers, server blades, or the like) and/or other computer components (e.g., processors, memories, communication interfaces, or the like). For example, anomaly detection platform 103 may be configured to train, host, and/or otherwise maintain a plurality of anomaly detection engines, which may, e.g., be machine learning models, configured to detect anomalies in system performance based on the input of system performance information. In some instances, the anomaly detection platform 103 may further be configured with an arbitration engine, which may, e.g., be configured to reconcile the results of the anomaly detection performed across the plurality of anomaly detection engines (which may, e.g., differ from engine to engine) using hybrid artificial intelligence. In these instances, the anomaly detection platform 103 may be configured to execute and/or otherwise initiate one or more corrective actions to address any detected system anomalies.

User device 104 may be or include one or more devices (e.g., laptop computers, desktop computer, smartphones, tablets, and/or other devices) configured for use in providing system administration functions. For example, the user device 104 may be configured to display one or more graphical user interfaces to indicate detected anomalies, initiate corrective actions, and/or perform other functions. Any number of such user devices may be used to implement the techniques described herein without departing from the scope of the disclosure.

Computing environment 100 also may include one or more networks, which may interconnect target system 102, anomaly detection platform 103, and user device 104. For example, computing environment 100 may include a network 101 (which may interconnect, e.g., target system 102, anomaly detection platform 103, and user device 104).

In one or more arrangements, target system 102, anomaly detection platform 103, and user device 104 may be any type of computing device capable of receiving a user interface, receiving input via the user interface, and communicating the received input to one or more other computing devices, and/or training, hosting, executing, and/or otherwise maintaining one or more machine learning models, displaying graphical user interfaces, and/or performing other functions. For example, target system 102, anomaly detection platform 103, user device 104 and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of target system 102, anomaly detection platform 103, and/or user device 104 may, in some instances, be special-purpose computing devices configured to perform specific functions.

Referring to FIG. 1B, anomaly detection platform 103 may include one or more processors 111, memory 112, and communication interface 113. A data bus may interconnect processor 111, memory 112, and communication interface 113. Communication interface 113 may be a network interface configured to support communication between anomaly detection platform 103 and one or more networks (e.g., network 101, or the like). Memory 112 may include one or more program modules having instructions that when executed by processor 111 cause anomaly detection platform 103 to perform one or more functions described herein and/or one or more databases that may store and/or otherwise maintain information which may be used by such program modules and/or processor 111. In some instances, the one or more program modules and/or databases may be stored by and/or maintained in different memory units of anomaly detection platform 103 and/or by different computing devices that may form and/or otherwise make up anomaly detection platform 103. For example, memory 112 may have, host, store, and/or include anomaly detection module 112*a* and arbitration module 112*b*. Anomaly detection module 112*a* may have instructions that direct and/or cause anomaly detection platform 103 to support a plurality of anomaly detection engines that execute advanced machine learning techniques to detect anomalies in system performance information. Arbitration module 112*b* may have instructions that direct and/or cause anomaly detection platform 103 to reconcile the outputs of the various anomaly detection engines of the anomaly detection module 112*a*.

Figure 2A:
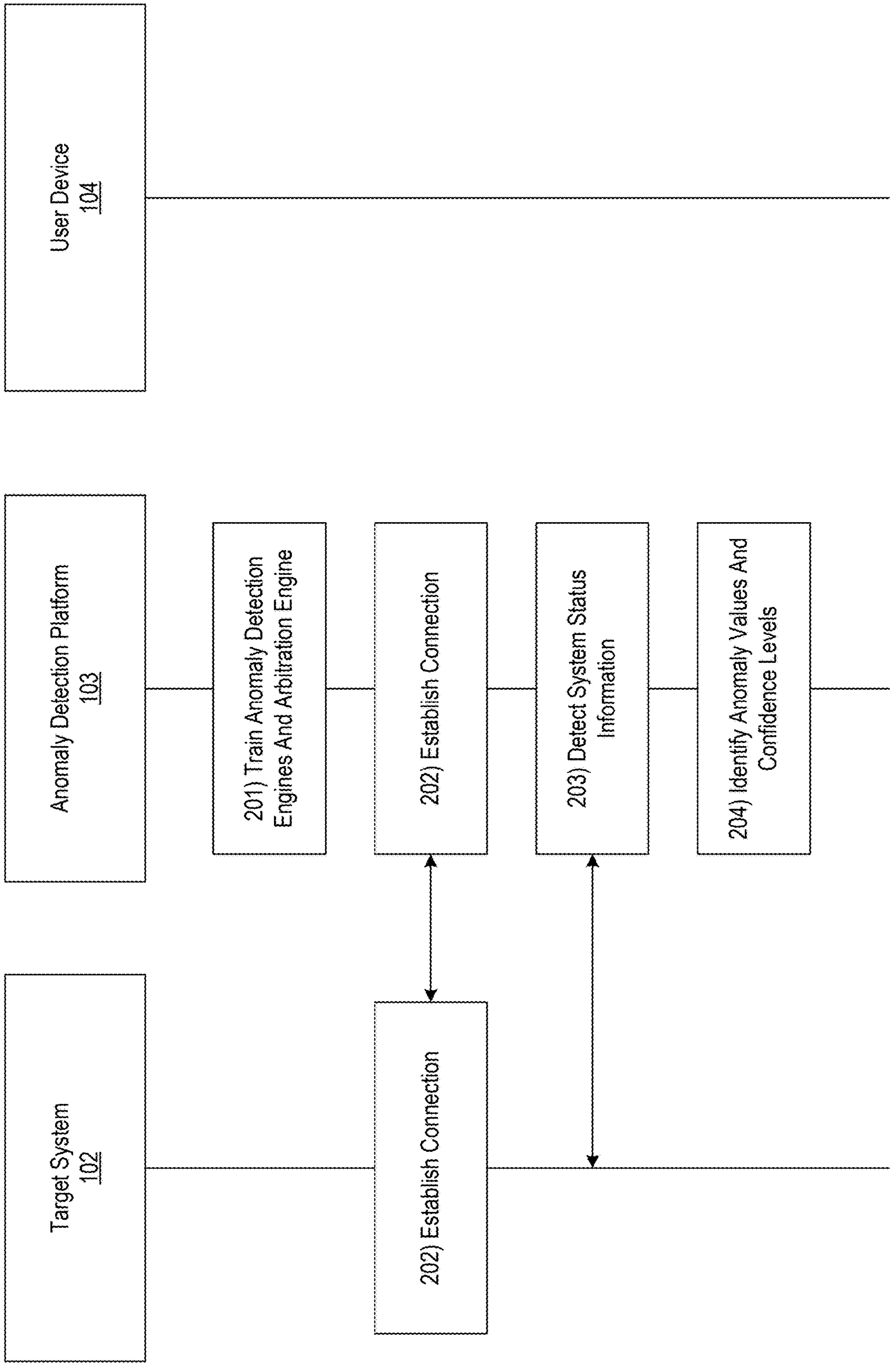
FIGS. 2A-2C depict an illustrative event sequence for using hybrid artificial intelligence to consolidate methods of anomaly detection in accordance with one or more example embodiments. in accordance with one or more example embodiments.
Figure 2B:
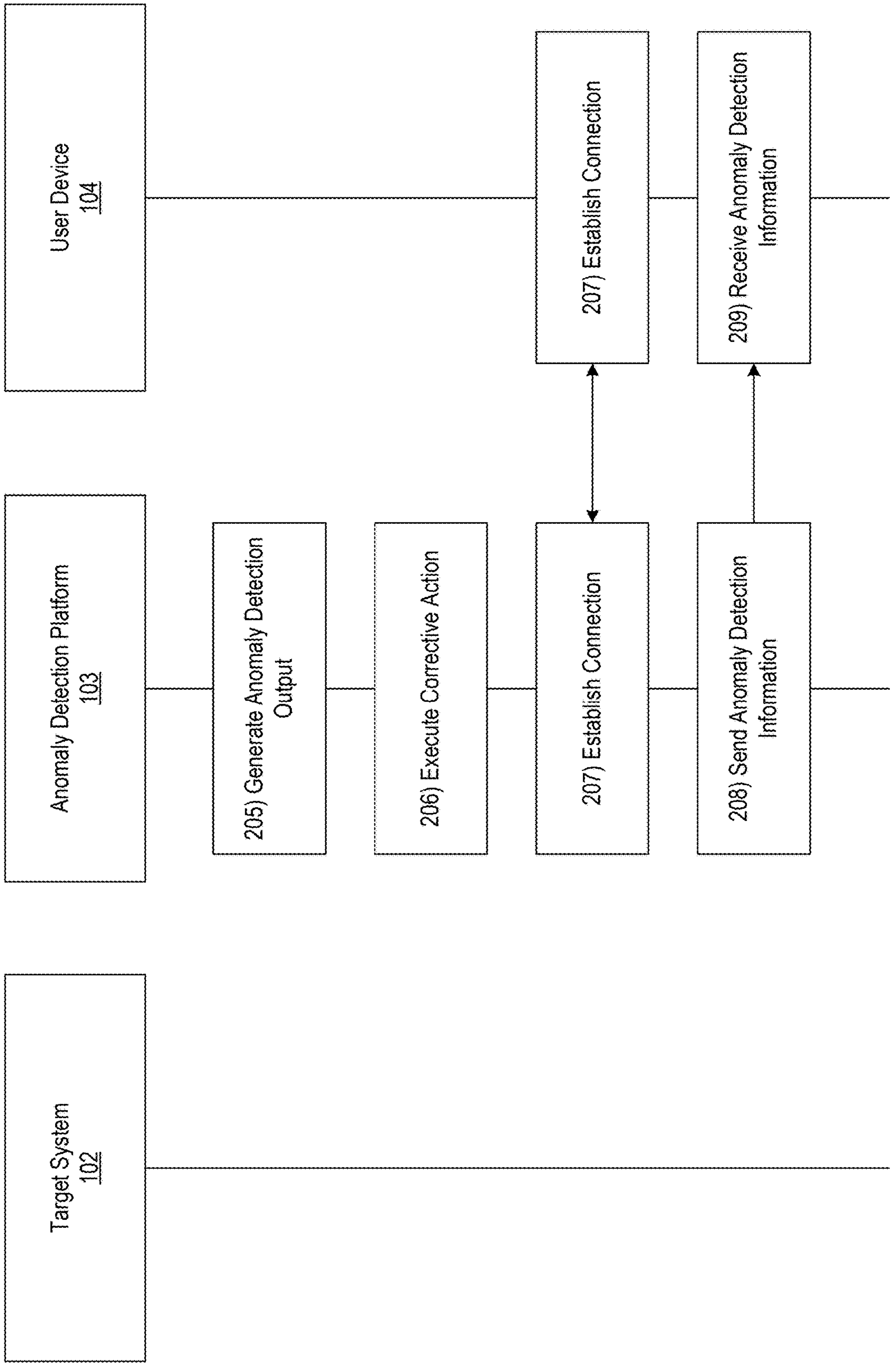
Figure 2C:
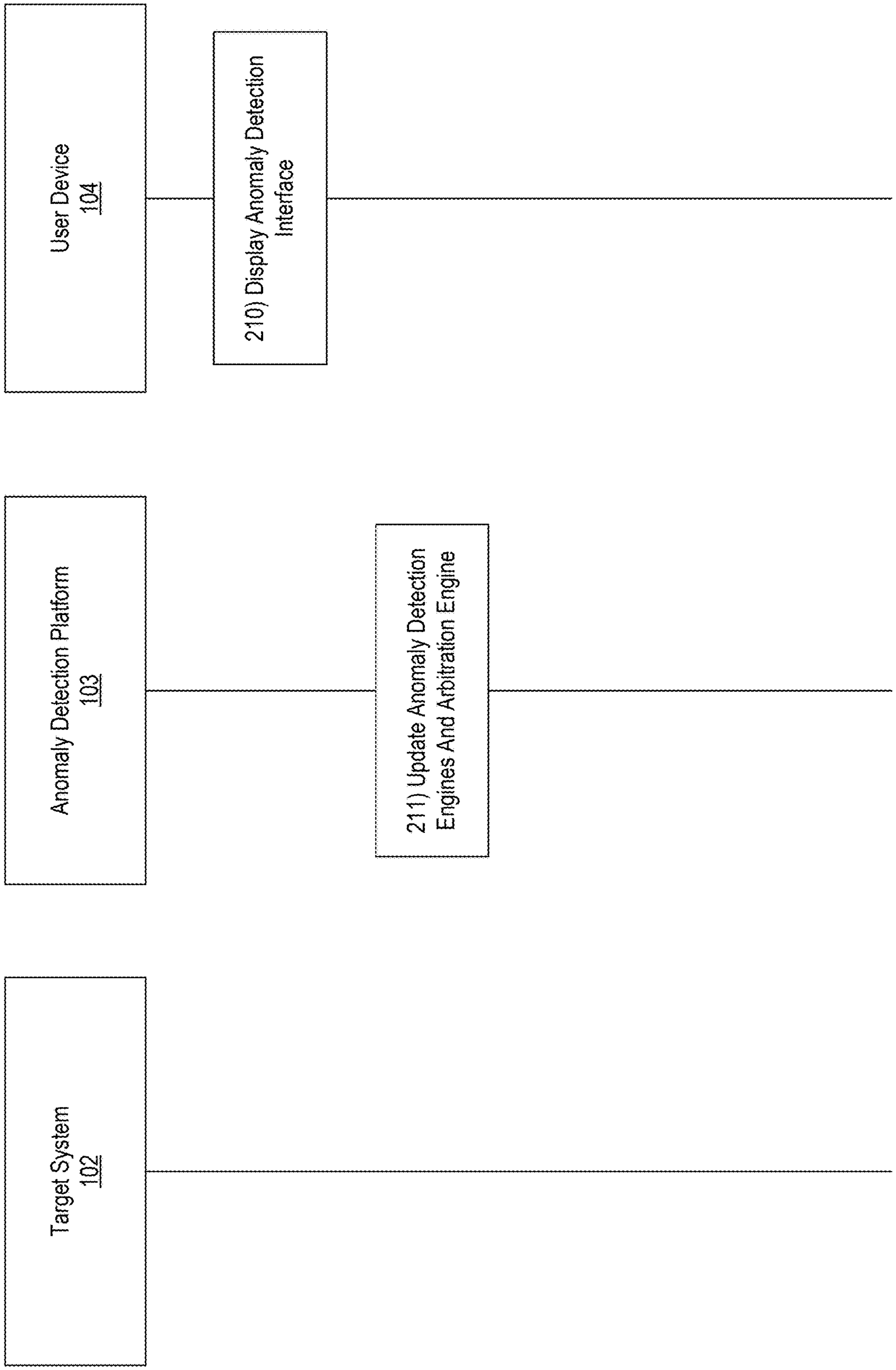

FIGS. 2A-2C depict an illustrative event sequence for using hybrid artificial intelligence to consolidate methods of anomaly detection in accordance with one or more example embodiments. Referring to FIG. 2A, at step 201, the anomaly detection platform 103 may train one or more anomaly detection engines. For example, the anomaly detection platform 103 may train the one or more anomaly detection engines to produce a binary value indicating whether or not an anomaly is detected based on input information, along with a confidence score corresponding to the binary value (e.g., indicating a confidence of the corresponding engine that the binary value correctly indicates whether or not an anomaly is detected).

In some instances, to perform such training, the anomaly detection platform 103 may receive historical system performance information indicating performance of one or more target systems. For example, the anomaly detection platform 103 may receive information indicating one or more of memory usage, computer processing unit (CPU) usage, available memory, memory consumption, communication patterns, processing speed, or the like. In some instances, this information may also include labels indicating anomaly or no anomaly. Additionally or alternatively, the anomaly detection platform 103 itself may identify whether particular information represents an anomaly by comparing values to a determined average, median, standard deviation threshold, and/or other threshold.

Additionally, the anomaly detection platform 103 may train the anomaly detection engines to output the confidence scores based on a distance between a given data point and the corresponding average, median, standard deviation threshold, and/or other threshold. In some instances, the confidence scores may be numeric values between zero and one, where one indicates the highest confidence and zero indicates the lowest confidence.

In some instances, in training the one or more anomaly detection engines, the anomaly detection platform 103 may use one or more supervised learning techniques (e.g., decision trees, bagging, boosting, random forest, k-NN, linear regression, artificial neural networks, support vector machines, and/or other supervised learning techniques), unsupervised learning techniques (e.g., classification, regression, clustering, anomaly detection, artificial neutral networks, isolation forest, SARIMAX, and/or other unsupervised models/techniques), and/or other techniques. In some instances, different techniques may be used to train the different anomaly detection engines (and thus, in some instances, each anomaly detection engine may train, employ, and/or otherwise implement different machine learning algorithms), and thus the binary outputs and/or confidence scores produced by the different anomaly detection engines may vary despite the input of the same system performance information.

In some instances, in addition to training the one or more anomaly detection engines, the anomaly detection platform 103 may also train an arbitration engine, which may, e.g., be a hybrid artificial intelligence engine configured to assign supplementary confidence scores to the anomaly detection engines. For example, to perform such training, the anomaly detection platform 103 may receive historical outputs from the anomaly detection engines (e.g., indicating whether or not an anomaly is detected), along with feedback information (both from the arbitration engine itself and/or from human input) indicating whether or not these outputs correctly identified an anomaly.

Using the above noted supervised learning techniques, unsupervised learning techniques, and/or other techniques, the anomaly detection platform 103 may establish stored correlations between the various anomaly detection engines and their trustworthiness (e.g., a likelihood that a correct decision of anomaly versus no anomaly is produced). In some instances, training the arbitration engine to establish these correlations may, for example, enable the arbitration engine to assign, for a given anomaly detection engine (the identity of which may be fed into the arbitration engine), one or more supplemental confidence values (e.g., a machine learning based value, human learning based value, and/or other values).

At step 202, the anomaly detection platform 103 may establish a connection with the target system 102. For example, the anomaly detection platform 103 may establish a first wireless data connection with the target system 102 to link the anomaly detection platform 103 to the target system 102 (e.g., in preparation for detecting system performance/status information). In some instances, the anomaly detection platform 103 may identify whether a connection is already established with the target system 102. If a connection is already established with the target system 102, the anomaly detection platform 103 might not re-establish the connection. If a connection is not yet established with the target system 102, the anomaly detection platform 103 may establish the first wireless data connection as described herein.

At step 203, the anomaly detection platform 103 may detect system status information of the target system 102. For example, the anomaly detection platform 103 may monitor the target system 102 and detect the system status information via the first wireless data connection. In doing so, the anomaly detection platform 103 may detect memory usage, computer processing unit (CPU) usage, available memory, memory consumption, communication patterns, processing speed, and/or other performance information associated with the target system 102.

At step 204, the anomaly detection platform 103 may input the system status information, detected at step 203, into the one or more anomaly detection engines to produce corresponding binary values indicating whether or not an anomaly is detected. In some instances, each of the anomaly detection engines may be configured to process different types of data, and thus different subsets of the system status information may be fed into each of the anomaly detection engines. In some instances, the same system status information may be fed into multiple different anomaly detection engines. For example, each anomaly detection engine may associate the system status information (either in full or in part) with the historical system status information used to initially train the anomaly detection engines at step 201. Once associated with the historical system status information, a label of "anomaly" or "no anomaly" may be assigned to the system status information by the given anomaly detection engine based on the stored label of the associated historical system status information. In instances where a label of "anomaly" is generated, a binary value of 0 may be output, whereas in instances where a label of "no anomaly" is generated, a binary value of 1 may be output. In some instances, a given anomaly detection engine may produce multiple (in some instances different) binary values. For example, while the CPU usage might not reflect an anomaly, the memory usage may be anomalous, or vice versa.

Figure 5:
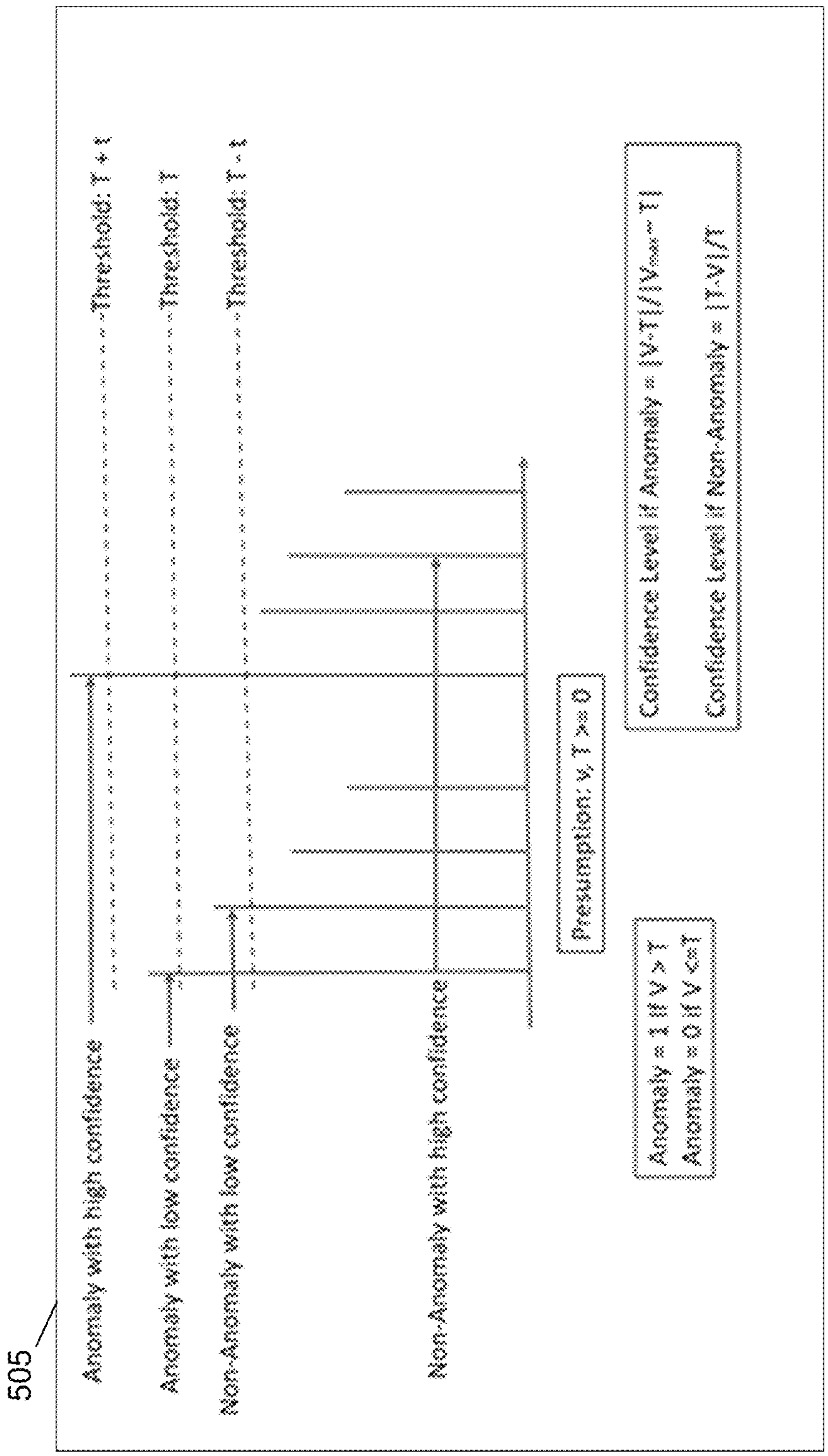
FIGS. 5-6 depict illustrative diagrams for using hybrid artificial intelligence to consolidate methods of anomaly detection in accordance with one or more example embodiments.

In some instances, the anomaly detection engines may also generate a confidence score corresponding to each binary value. More specifically, the anomaly detection engines may have threshold values for the various categories of historical system status information, which may be used to establish confidence scores associated with a given binary value. In some instances, these thresholds may be based on the corresponding average, median, standard deviation, and/or other thresholds values established for the particular category of system status information during the training at step 201. To identify the confidence score of a particular binary value, the following formula may be applied: confidence level if anomaly=$|V-T|/|V_{max}-T|$; confidence level if no anomaly==$|T-V|/T$, where T is the threshold value and V is the value of the system status information. Likewise, the binary value itself may be identified based on comparison of V to T, where the binary value is set using the following formula: binary value=1 if V>T (no anomaly); binary value=0 if V<=T (anomaly). This is further illustrated in chart 505 of FIG. 5, which illustrates that both anomaly and no anomaly decisions may be made with different levels of confidence. In some instances, a further threshold value (e.g., t as illustrated in FIG. 5), may be added or subtracted from the threshold value T to define high, low, and/or other confidence level ranges. In some instances, either of these threshold values may be specific to a system, type of information, and/or otherwise. In some instances, a value of t that may be added to the threshold T value may be different than a value of t that may be subtracted from the threshold T value.

Figure 6:
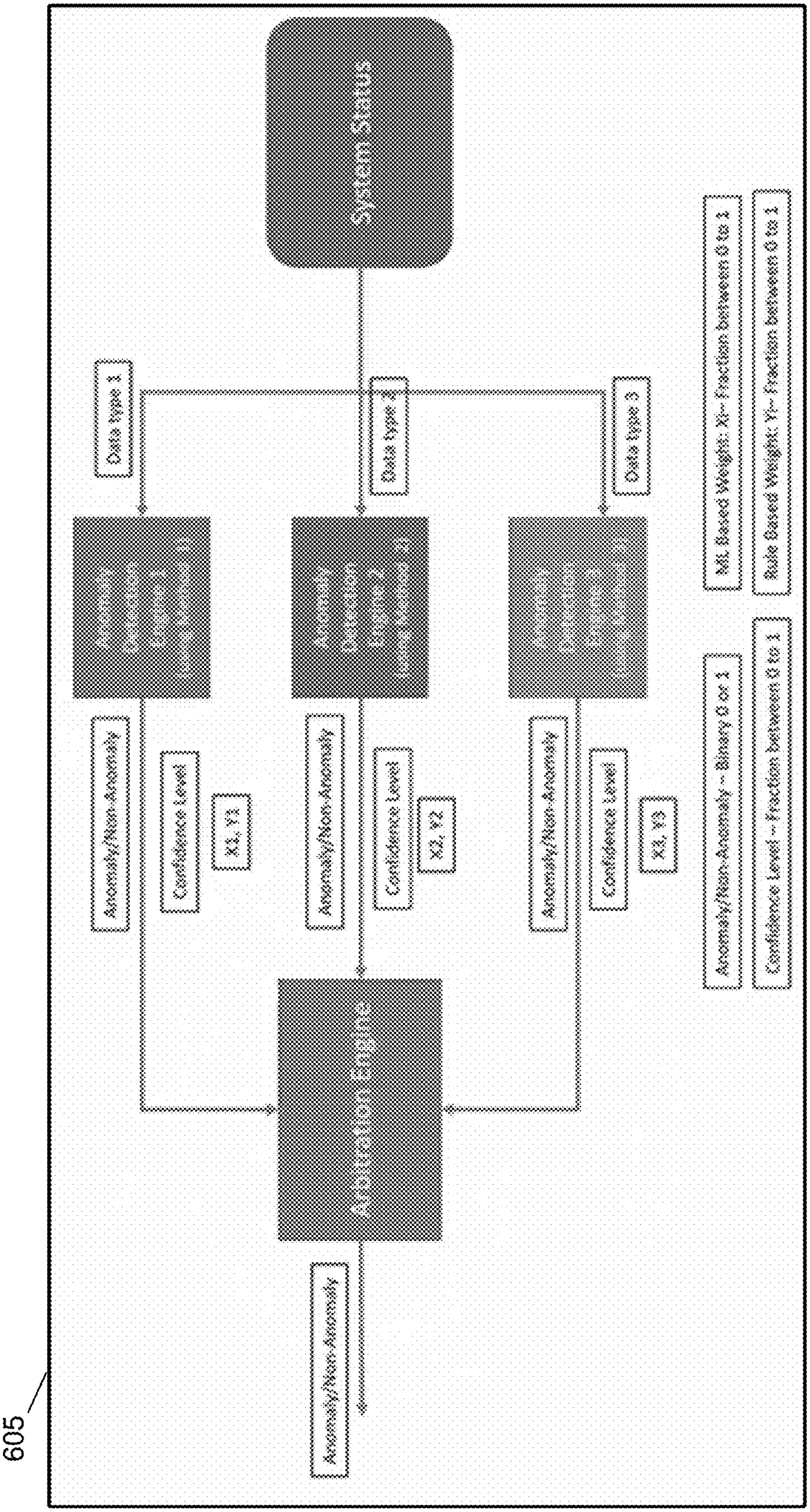

Using similar techniques, binary values and confidence values may be generated by each of the plurality of anomaly detection engines. For example, as is illustrated in chart 605 of FIG. 6, an anomaly decision and corresponding confidence level may be produced for each of three different anomaly detection engines.

Referring to FIG. 2B, at step 205, the anomaly detection platform 103 may use an arbitration engine to generate an anomaly detection output based on the various binary values and the corresponding confidence scores produced by each of the anomaly detection engines as described at step 204. For example, in some instances, the anomaly detection platform 103 may input identification information of the anomaly detection engines into the arbitration engine, which may, e.g., identify, using the stored correlations between the supplemental confidence values established at step 201, supplemental confidence values for each anomaly detection engine (e.g., a first value based on machine learning intelligence, a second value based on human intelligence, and/or other values). In some instances, the anomaly detection platform 103 may select an anomaly detection engine with the highest supplemental confidence value (e.g., highest machine learning based value, human intelligence value, combined value, or the like). Additionally or alternatively, the arbitration engine may generate a weighted confidence level by applying the supplemental confidence value(s) to the confidence values generated by the anomaly detection engines themselves (e.g., by multiplying the values). In these instances, the arbitration engine may select an anomaly detection engine based on the weighted confidence levels (e.g., select an anomaly detection engine associated with the highest weighted confidence level). After selecting an anomaly detection engine, the arbitration engine may identify the binary value output by that engine, and compare the binary value output to a threshold (e.g., 0.5 or the like). If the binary value output exceeds the threshold, the arbitration engine may output anomaly detection information of "no anomaly." Otherwise, if the binary value is less than or equal to the threshold, the arbitration engine may output anomaly detection information of "anomaly." Although the threshold of 0.5 is described herein, a different threshold may be implemented without departing from the disclosure. In some instances, this detection of whether or not an anomaly is detected may be performed in real time, in a predictive manner, and/or otherwise. If an anomaly is detected, the anomaly detection platform 103 may proceed to step 206. Otherwise, if no anomaly is detected, the anomaly detection platform 103 may proceed to step 211.

At step 206, based on detection of an anomaly at the target system 102, the anomaly detection platform 103 may initiate one or more corrective actions. For example, the anomaly detection platform 103 may take the target system offline, redistribute load of the target system, add memory to the target system, and/or perform other actions to address the detected anomaly. In some instances, in doing so, the anomaly detection platform 103 may send one or more commands directing the target system 102 and/or other systems to execute one or more actions to achieve the correction, which may, e.g., cause the target system 102 and/or other systems to perform the corresponding actions.

At step 207, the anomaly detection platform 103 may establish a connection with the user device 104. For example, the anomaly detection platform 103 may establish a second wireless data connection with the user device 104 to link the anomaly detection platform 103 to the user device 104 (e.g., in preparation for sending anomaly detection information). In some instances, the anomaly detection platform 103 may identify whether or not a connection is already established with the user device 104. If a connection is already established with the user device 104, the anomaly detection platform 103 might not re-establish the connection. If a connection is not yet established with the user device 104, the anomaly detection platform 103 may establish the second wireless data connection as described herein.

At step 208, the anomaly detection platform 103 may generate anomaly detection information (e.g., indicating the detected anomaly) and send the anomaly detection information to the user device 104. For example, the anomaly detection platform 103 may send the anomaly detection information via the communication interface 113 and while the second wireless data connection is established. In some instances, the anomaly detection platform 103 may also send one or more commands directing the user device 104 to display the anomaly detection information.

At step 209, the user device 104 may receive the anomaly detection information. For example, the user device 104 may receive the anomaly detection information while the second wireless data connection is established. In some instances, the user device 104 may also receive the one or more commands directing the user device 104 to display the anomaly detection information.

Figure 4:
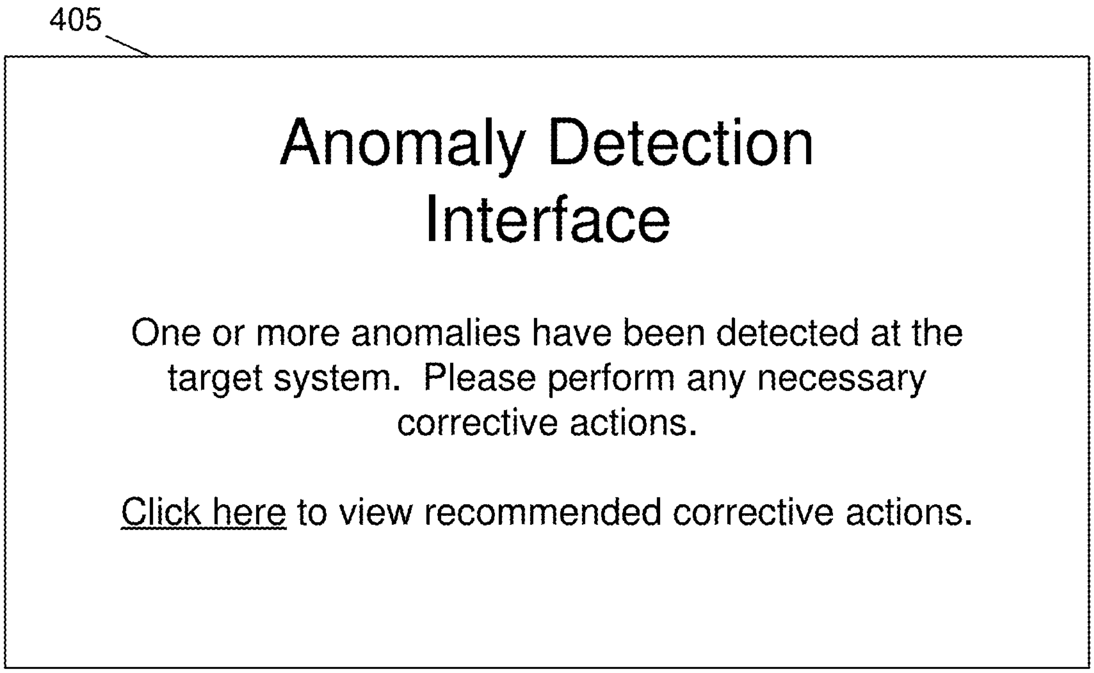
FIG. 4 depicts an illustrative user interface for using hybrid artificial intelligence to consolidate methods of anomaly detection in accordance with one or more example embodiments.

Referring to FIG. 2C, at step 210, based on or in response to the one or more commands directing the user device 104 to display the anomaly detection information, the user device 104 may display the anomaly detection information. For example, the user device 104 may display a graphical user interface similar to graphical user interface 405, which is illustrated in FIG. 4.

At step 211, the anomaly detection platform 103 may update the anomaly detection engines and/or arbitration engine based on the system status information, confidence scores, binary values, anomaly detection outputs, user feedback information, and/or other information. In doing so, the anomaly detection platform 103 may continue to refine the anomaly detection engines and/or arbitration engine using a dynamic feedback loop which may, e.g., increase the accuracy and effectiveness of the anomaly detection platform 103 in reconciling different model outputs for consolidated anomaly detection. For example, the anomaly detection platform 103 may reinforce, modify, and/or otherwise update the anomaly detection engines, thresholds, or the like thus causing the anomaly detection platform 103 to continuously improve.

In some instances, the anomaly detection platform 103 may continuously refine anomaly detection engines and/or arbitration engine. In some instances, the anomaly detection platform 103 may maintain an accuracy threshold, and may pause refinement (through the dynamic feedback loops) of the anomaly detection engines and/or thresholds if the corresponding accuracy is identified as greater than the corresponding accuracy threshold. Similarly, if the accuracy fails to be equal or less than the given accuracy threshold, the anomaly detection platform 103 may resume refinement of the engine through the corresponding dynamic feedback loop.

Figure 3:
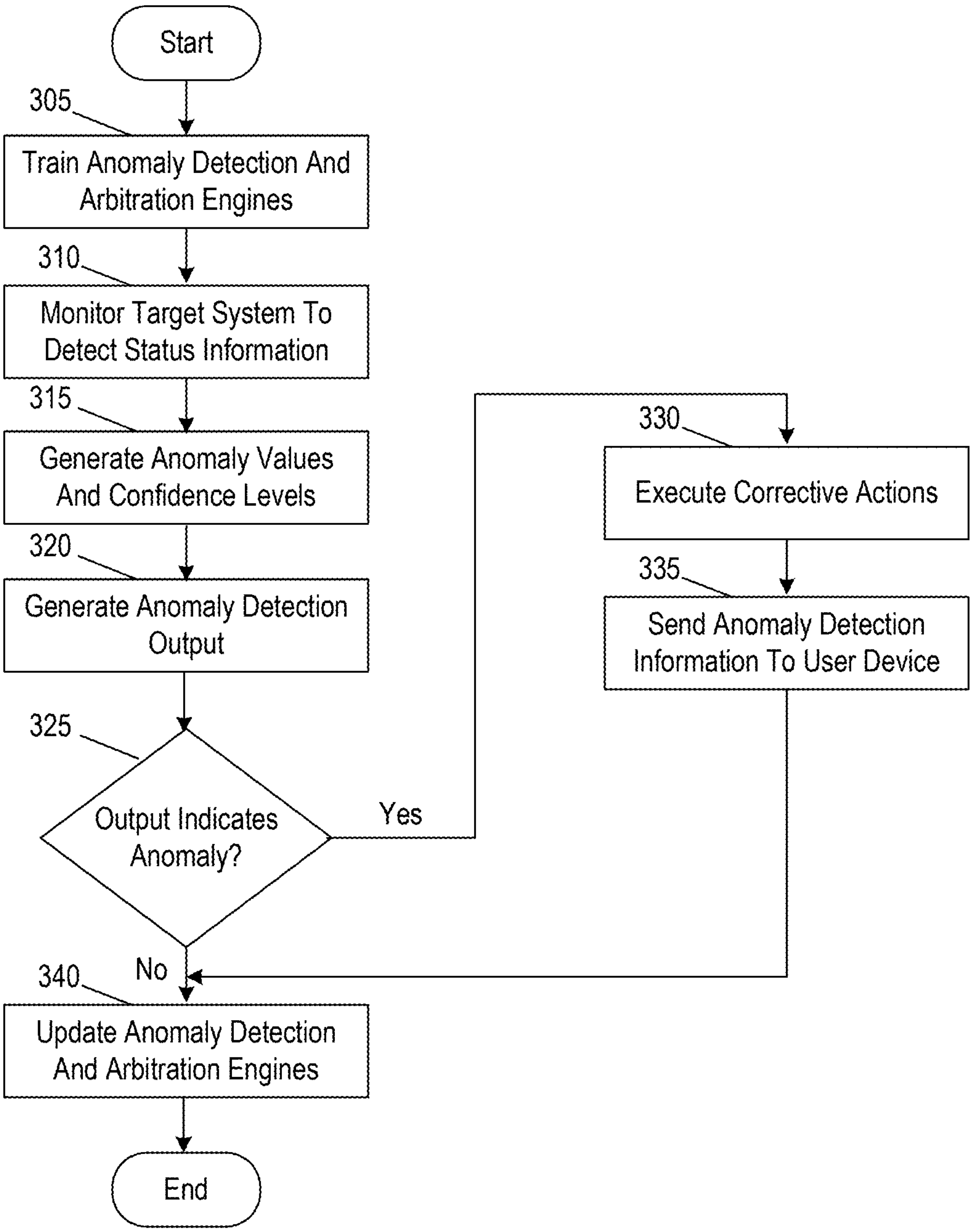
FIG. 3 depicts an illustrative method for using hybrid artificial intelligence to consolidate methods of anomaly detection in accordance with one or more example embodiments.

FIG. 3 depicts an illustrative method for using hybrid artificial intelligence to consolidate methods of anomaly detection in accordance with one or more example embodiments. Referring to FIG. 3, at step 305, a computing platform comprising one or more processors, memory, and a communication interface may train a plurality of anomaly detection engines and an arbitration engine. At step 310, the computing platform may monitor a target system to detect system status information. At step 315, the computing platform may generate anomaly values and confidence values corresponding to the system status information using the plurality of anomaly detection engines. At step 320, the computing platform may use the arbitration engine to reconcile the anomaly values and confidence values of the plurality of anomaly detection engines and generate a corresponding anomaly detection output. At step 325, the computing platform may identify whether or not the anomaly detection output indicates that the system status information indicates an anomaly based on the anomaly detection output. If an anomaly is not detected, the computing platform may proceed to step 340. Otherwise, if an anomaly is detected, the computing platform may proceed to step 330. At step 330, the computing platform may execute one or more corrective actions to address the detected anomaly. At step 335, the computing platform may send anomaly detection information to a user device for display. At step 340, the computing platform may update the anomaly detection engines and the arbitration engine.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:

at least one processor;

a communication interface communicatively coupled to the at least one processor; and memory storing computer-readable instructions that, when executed by the at least one processor, cause the computing platform to:

train, using historical anomaly prediction information, a hybrid artificial intelligence engine, wherein training the hybrid artificial intelligence engine configures the hybrid artificial intelligence engine to assign weight values to each of a plurality of anomaly detection engines and to select an anomaly detection result from the plurality of anomaly detection engines based on the weight values, wherein assigning the weight values comprises assigning, to each of the plurality of anomaly detection engines, a first weight value generated using statistical machine learning and a second weight value generated based on human intelligence;

monitor a system to collect system status information;

input the system status information into each of the plurality of anomaly detection engines, wherein each of the plurality of anomaly detection engines outputs, based on the system status information, a corresponding binary value indicating whether the system status information is anomalous according to a given anomaly detection engine, and a corresponding confidence level associated with the corresponding binary value;

input information of the plurality of anomaly detection engines into the hybrid artificial intelligence engine, wherein the hybrid artificial intelligence engine assigns the weight values to each of the plurality of anomaly detection engines and selects a binary value based on the weighting;

compare the selected binary value to a predetermined threshold value;

based on identifying that the selected binary value is less than the predetermined threshold value, label the system as experiencing anomalous behavior; and execute one or more corrective actions to address the anomalous behavior.

2. The computing platform of claim 1, wherein the memory stores additional computer readable instructions that, when executed by the at least one processor, cause the computing platform to:

train, using historical system status information, the plurality of anomaly detection engines, wherein each of the plurality of anomaly detection engines corresponds to a different machine learning model, and wherein training the plurality of anomaly detection engines configures each of the plurality of anomaly detection engines to output, for given system status inputs, a binary value indicating whether or not the system status input indicates an anomaly, and a confidence level associated with the binary value.

3. The computing platform of claim 2, wherein the historical system status information comprises one or more of: memory usage, computer processing unit (CPU) usage, available memory, memory consumption, communication patterns, processing speed, or labels indicating anomaly or no anomaly.

4. The computing platform of claim 2, wherein the confidence level indicates a confidence of a corresponding anomaly detection engine that the binary value correctly indicates whether or not an anomaly is detected.

5. The computing platform of claim 1, wherein one of the plurality of anomaly detection engines includes an isolation forest model to identify the binary value.

6. The computing platform of claim 1, wherein the system is labelled as experiencing the anomalous behavior in real time.

7. The computing platform of claim 1, wherein the system is labelled as experiencing the anomalous behavior in a predictive manner.

8. The computing platform of claim 1, wherein the weight values are specific to each application of each of the plurality of anomaly detection engines in a particular problem domain.

9. The computing platform of claim 1, wherein selecting the binary value comprises selecting the binary value produced by one of the plurality of anomaly detection engines associated with the highest weight value.

10. The computing platform of claim 1, wherein executing the one or more corrective actions comprises one or more of: taking the system offline, redistributing load of the system, or adding memory to the system.

11. The computing platform of claim 1, wherein the memory stores additional computer readable instructions that, when executed by the at least one processor, cause the computing platform to:

send, to a user device of a system administrator, an alert indicating the anomalous behavior and one or more commands directing the user device to display the alert, wherein sending the one or more commands directing the user device to display the alert causes the user device to display the alert.

12. The computing platform of claim 1, wherein the memory stores additional computer readable instructions that, when executed by the at least one processor, cause the computing platform to:

update, based on the system status information and the label, the plurality of anomaly detection engines.

13. The computing platform of claim 1, wherein the memory stores additional computer readable instructions that, when executed by the at least one processor, cause the computing platform to:

update, based on feedback associated with the label, the hybrid artificial intelligence engine.

14. A method comprising:

at a computing platform comprising at least one processor, a communication interface, and memory:

training, using historical anomaly prediction information, a hybrid artificial intelligence engine, wherein training the hybrid artificial intelligence engine configures the hybrid artificial intelligence engine to assign weight values to each of a plurality of anomaly detection engines and to select an anomaly detection result from the plurality of anomaly detection engines based on the weight values, wherein assigning the weight values comprises assigning, to each of the plurality of anomaly detection engines, a first weight value generated using statistical machine learning and a second weight value generated based on human intelligence;

monitoring a system to collect system status information;

inputting the system status information into each of the plurality of anomaly detection engines, wherein each of the plurality of anomaly detection engines outputs, based on the system status information, a corresponding binary value indicating whether the system status information is anomalous according to a given anomaly detection engine, and a corresponding confidence level associated with the corresponding binary value;

inputting information of the plurality of anomaly detection engines into the hybrid artificial intelligence engine, wherein the hybrid artificial intelligence engine assigns the weight values to each of the plurality of anomaly detection engines and selects a binary value based on the weighting;

comparing the selected binary value to a predetermined threshold value;

based on identifying that the selected binary value is less than the predetermined threshold value, labeling the system as experiencing anomalous behavior; and executing one or more corrective actions to address the anomalous behavior.

15. The method of claim 14, further comprising:

training, using historical system status information, the plurality of anomaly detection engines, wherein each of the plurality of anomaly detection engines corresponds to a different machine learning model, and wherein training the plurality of anomaly detection engines configures each of the plurality of anomaly detection engines to output, for given system status inputs, a binary value indicating whether or not the system status input indicates an anomaly, and a confidence level associated with the binary value.

16. The method of claim 15, wherein the historical system status information comprises one or more of: memory usage, computer processing unit (CPU) usage, available memory, memory consumption, communication patterns, processing speed, or labels indicating anomaly or no anomaly.

17. The method of claim 15, wherein the confidence level indicates a confidence of a corresponding anomaly detection engine that the binary value correctly indicates whether or not an anomaly is detected.

18. The method of claim 14, wherein one of the plurality of anomaly detection engines includes an isolation forest model to identify the binary value.

19. One or more non-transitory computer-readable media storing instructions that, when executed by a computing platform comprising at least one processor, a communication interface, and memory, cause the computing platform to:

train, using historical anomaly prediction information, a hybrid artificial intelligence engine, wherein training the hybrid artificial intelligence engine configures the hybrid artificial intelligence engine to assign weight values to each of a plurality of anomaly detection engines and to select an anomaly detection result from the plurality of anomaly detection engines based on the weight values, wherein assigning the weight values comprises assigning, to each of the plurality of anomaly detection engines, a first weight value generated using statistical machine learning and a second weight value generated based on human intelligence;

monitor a system to collect system status information;

input the system status information into each of the plurality of anomaly detection engines, wherein each of the plurality of anomaly detection engines outputs, based on the system status information, a corresponding binary value indicating whether the system status information is anomalous according to a given anomaly detection engine, and a corresponding confidence level associated with the corresponding binary value;

input information of the plurality of anomaly detection engines into the hybrid artificial intelligence engine, wherein the hybrid artificial intelligence engine assigns the weight values to each of the plurality of anomaly detection engines and selects a binary value based on the weighting;

compare the selected binary value to a predetermined threshold value;

based on identifying that the selected binary value is less than the predetermined threshold value, label the system as experiencing anomalous behavior; and execute one or more corrective actions to address the anomalous behavior.

* * * * *